Oct. 19, 1971  A. FLECHER  3,613,244
SLIDE BOLT

Filed Sept. 15, 1969  2 Sheets-Sheet 1

FIG.6
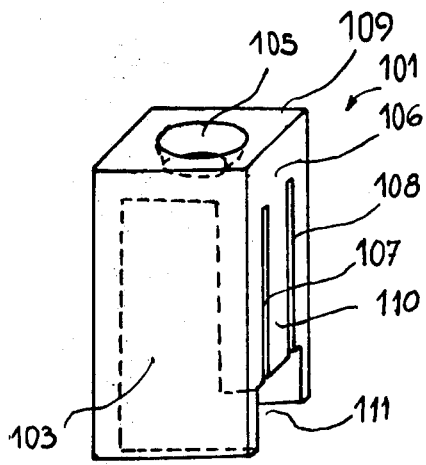
FIG.8
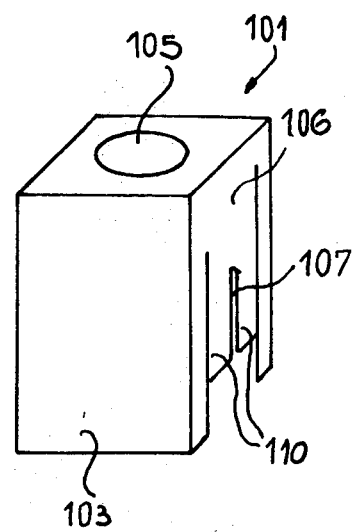
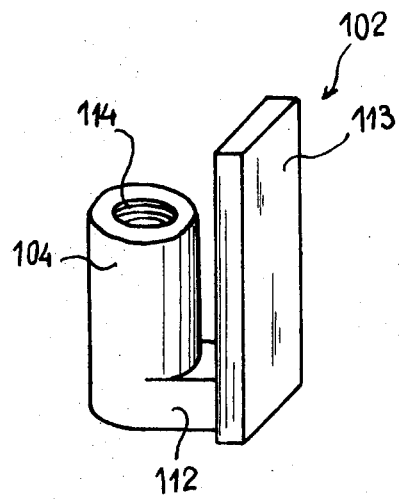
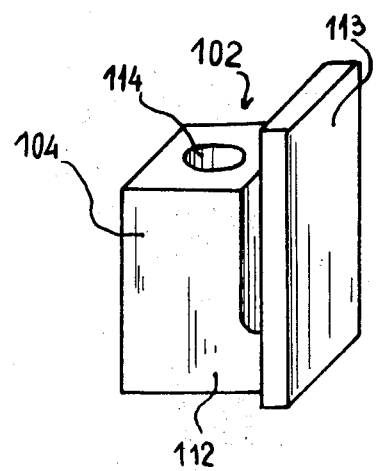
FIG.7
FIG.9

United States Patent Office 3,613,244
Patented Oct. 19, 1971

3,613,244
SLIDE BOLT
Albert Flecher, 35 Rue Herder, F-67,
Strasbourg, France
Filed Sept. 15, 1969, Ser. No. 858,084
Claims priority, application France, Sept. 17, 1968,
9,270; Sept. 3, 1969 6931254
Int. Cl. A61c 13/22
U.S. Cl. 32—5                                     4 Claims

ABSTRACT OF THE DISCLOSURE

Semi-automatic locking means for artificial dentures part of which is readily removable and part of which can only be removed by a dental surgeon, comprising a male element with means for guiding it when mounting it and for ensuring vertical stability, and a female element provided with centering and locking means, and a resilient element for keeping the male and female elements assembled.

A slightly modified form of the locking means can be utilised as an attachment.

---

Locking bolts for artificial dentures are already known. In these other devices the locking is effected either by a practically inaccessible screw in the mouth, or a spring wire which is superposed on the element, resulting in the construction of elements of excessive volume and of very serious difficulties, which the dentist has to surmount when placing the denture in the patient's mouth.

The present invention aims at providing an improved locking bar, the principal advantage of which resides in the peculiarity of the locking, which is effected automatically, the placing in the mouth being effected by a simple pressure. The unlocking can only be effected by a practising physician, by means of a pointed instrument. The entire device is fluid tight when in a locked position.

With this end in view, the invention concerns a slide bolt with semi-automatic locking for artificial teeth with a removable-irremovable part likewise capable of being used as an attachment, characterised by the feature that it comprises a male element, provided with means for guiding at the time of mounting, while ensuring stability in a vertical direction, a female element provided with centering and locking means for effecting the locking when utilising the device as an attachment, and a resilient element for holding the male and female elements together.

The invention will be well understood by referrinng to the following description, given by way of example but not of limitation, and to the accompanying drawings in which:

FIGS. 6 and 7 show the female element and the male element of a locking bar according to one form of construction;

FIGS. 8 and 9 show the female element and the male element of a locking bar according to another embodiment.

Figure 4:
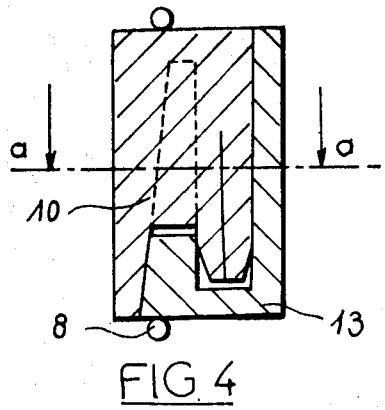
FIG. 4 is a view in sectional elevation of the assembled locking bar.
Figure 2:
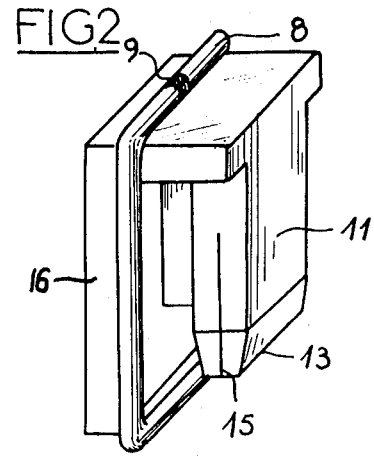
FIG. 2 shows the male element of the locking bar.
Figure 5:
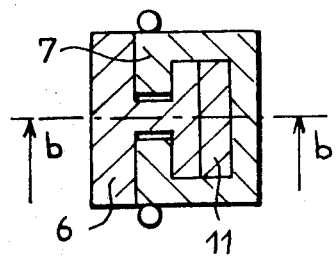
FIG. 5 is a view in horizontal section of the assembled locking bar.
Figure 3:
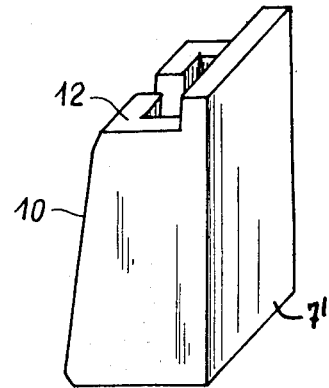
FIG. 3 shows the female element of the same locking bar.
Figure 1:
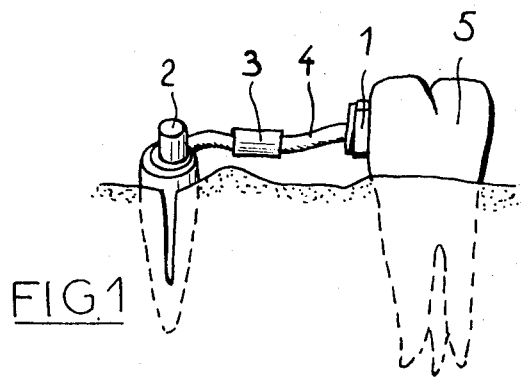
FIG. 1 shows a tooth provided with a slide bolt or locking bar according to the invention.

Referring to FIGS. 1 to 5, the invention relates to a sliding locking bar or clasp 1, utilised in the removable-irremovable types of artificial teeth. This type of denture is composed (diagrammatically) of three parts, two of which are fixed parts 1 and 2 which can only be removed from the patient's mouth by a practicing dental surgeon.

The third part, 3, being itself removable, can be taken out by the patient. This slide bolt or locking bar with semi-automatic locking ensures the fixing of an extension element 4, which may be either a bar upon which the removable part of the denture 3 will be engaged, or else a bridge element.

This semi-automatic slide bar has the external appearance of a box of precious metal surrounded by a spring wire 8 of special platinum-plated gold, fixed by a welded or soldered point 9. It is composed of two parts, a male part 6 and a female part 7, fitting together vertically, and so designed that the set or play of an inclined plane 10, situated upon the front face of the female part, liberates, upon introduction, the spring 8, and engages it, at the end of the stroke, beneath the casing, thus automatically ensuring the locking.

Moreover, the horizontal stability is ensured by the tongue 11, of dovetailed shape, the studied base 13 of which facilitates the introduction of the two parts without any fumbling.

The fluid tightness of the locking bar, as well as its vertical stability, are ensured by the supporting planes, both upper, 12, and lower, 13.

Finally, the tongue 11 is provided with a slit 15, enabling the locking to be effected when the locking bar is being used as an attachment.

The female part 7 is designed to be permanently soldered or welded to a fixed element 5, for instance a crown or a tooth with a metal pivot, and the male part 6 is soldered or welded to the irremovable extension element 4.

The placing of the device in the mouth is effected by a simple pressure upon the male element, which is introduced vertically at the same time as the irremovable element to which it is welded or soldered. The spring slides automatically upon the inclined plane of the female part, and likewise engages, at the end of the stroke, beneath the lower part of the casing.

The depositing or positioning of the removable-irremovable element, when it proves necessary, is effected by a practicing surgeon, who effects it by exerting a pull upon the spring by means of a pointed instrument, such as a probe. The male element is liberated and withdrawn by a simple pressure in an upward direction.

The main advantage of this locking bar resides in the particular type of locking, which is effected automatically as explained above. Furthermore, its conception, which ensures a perfect stability as a result of the support upon all three faces of the male part, enables it to be used in an extra-coronary position, that is to say, it is useless to lodge it in the moulded or cast part of the fixed element 5, and prevents any subsidence of the extension element 4.

The pillar tooth itself is locked in its lateral movements and in its forward and backward movements. The pillar-tooth unit and framework is ensured of absolute stability.

The introduction into the mouth is easy.

The spring wire eliminates any vertical pull when the patient is releasing the movable denture.

Owing to the possibility, explained above, of effecting the locking of the tongue 11, the sliding or locking bar can be utilised as an attachment without transformation. All that is necessary is to suppress the spring 8, actuate the tongue, and then one has automatically available an item acting as an attachment, which easily resolves in the mouth the transformations necessitated by any injury to the pillar tooth.

Referring to FIGS. 6 and 7: as indicated above, the locking bar consists of a female element 101 and a male element 102.

The female element 101 presents externally the form of a casing, which, on account of the use of the locking bar, is of precious metal, such as gold.

It is provided with a central cavity 103, in which will be lodged the cylindrical body 104 of the male element 102. At the upper part of the central cavity 103 there is an orifice 105, preferably in the shape of an inverted frustum of a cone, the major base of which is on the outside. In one of the faces 106, one or more grooves 107 and 108 are cut, parallel to the vertical generatrix of the female element 102. The grooves 107 and 108 stop short at a certain distance from the upper face 109 of the casing 102. Owing to this, the central part 110, located between the two grooves 107 and 108, is resilient, and serves as a spring for maintaining the locking between the elements 101 and 102.

This same face 106 is provided with an orifice 111 serving as a lodgment for the base 112 of the male element 102. The cylindrical body 104 of the element 102 is perpendicular to the base 112 and parallel to the support 113. After being put in position, the face 106 of the female element 101 is trapped between the cylindrical body 104 and the support 113 of the male element 102.

The cylindrical body 104 is provided with a central orifice 114, preferably tapped for the introduction of a fixing element such as a screw. This fixing element, the head of which is embedded in the frusto-conical orifice 105 of the female element 101, ensures the permanent assembly between the male element 103 and the female element 101, securing these two elements to one another.

By simple transformation of the screw, the element can be utilised as a locking bar and as an attachment. All that is necessary is to remove the screw thread from the screw, to lodge the head of this screw in the frusto-conical orifice 105 and to make a spot weld or soldering, to actuate the tongue 110. In this way one has available a piece capable of acting as an attachment, which easily resolves in the mouth the transformation necessitated by any deterioration of a pillar tooth.

The fixing screw may certainly be replaced by any other fixing element.

According to FIGS. 8 and 9, the body 4 of the male element 101 is a parallelepiped, and therefore differs in shape from the body 104 of FIG. 7. This may however be of any shape. All that is necessary is that the lodgment established in the female element should have a cross section identical with that of the body 104 of the male element 102.

Although the invention has been described in connection with a particular form of construction, it will be understood that it is in no way limited thereto, and that the forms and materials may be modified in various ways without thereby going outside the scope and the spirit of the invention.

I claim:

1. A device for connecting one dental element to another for supporting and anchoring artificial teeth within a users mouth, comprising a first component fixed to one of said elements and having a projecting portion and an extending portion connected thereto and to said projecting portion, said extending and projecting portions thereby being combined to define a tongue having a dove-tail shape, a second component fixed to the other said element and having a recessed portion for receiving said projecting portion therewithin and a cut-out portion in one wall to receive said extending portion upon joining of said projecting and recessed portions, said one wall of said second component being inclined angularly with respect to the sidewalls of said recessed portion, spring means for urging said projecting portion to remain within said recessed portion, said spring means comprising a loop of resilient wire fixed to said first component at a quiescent position and engageable by said inclined wall for deflection to permit joining of said projecting and recessed portions, said wire being disposed to spring back to its said quiescent position upon completion of said joining to engage a wall of said second component which lies adjacent said inclined wall thereby locking said first and second components together, and notched means on one of said components for use as anchoring means when the other of said components is removed from the users mouth.

2. A device for connecting one dental element to another for supporting and anchoring artificial teeth within a users mouth, comprising a first component fixed to one of said elements and having a projecting portion, said projecting portion having a threaded opening in its free end, a second component fixed to the other said element and having a recessed portion for receiving said projecting portion therewithin, said second component having an orifice in one wall thereof, said orifice being in communication with said recessed portion and having a shoulder for supporting a screw head, and further comprising a screw having a shank for passage through said orifice and for threadable reception in said projecting portion opening, and having a head for engaging said orifice shoulder, thereby providing fastening means for holding said first and second components in a joined configuration, spring means for urging said projecting portion to remain within said recessed portion, and notched means on one of said components for use as anchoring means when the other of said components is removed from the users mouth.

3. A device for connecting one dental element to another as set forth in claim 2, in which notched means comprise two notches extending from an edge of said second component along one side wall thereof, said two notches being in communication with said recessed portion along their longitudinal extent, and in which said spring means comprises a resilient tongue defined by the portion of said one side wall of said first component disposed between said notches, whereby said resilient tongue is deflected upon joining said projecting and recessed portions to exert a force against said projecting portion.

4. A device for connecting one dental element to another for supporting and anchoring artificial teeth within a users mouth, comprising a first component fixed to one of said elements and having a projecting portion, a second component fixed to the other said element and having a recessed portion for receiving said projecting portion therewithin, said first component having an extending portion connected thereto and to said projecting portion, said extending and projecting portions thereby being combined to define a tongue having a dove-tail shape, said second component having a cut-out portion in one wall to receive said extending portion upon joining of said projecting and recessed portions, said one wall of said second component being inclined angularly with respect to the sidewalls of said recessed portion, and spring means comprising a loop of resilient wire fixed to said first component at a quiescent position and engageable by said inclined wall for deflection to permit joining of said projecting and recessed portions, said wire being disposed to spring back to its said quiescent position upon completion of said joining to engage a wall of said second component which lies adjacent said inclined wall, thereby locking said first and second components together.

References Cited

UNITED STATES PATENTS

| | | | |
|---|---|---|---|
| 2,009,434 | 7/1935 | Chayes et al. | 32—5 |
| 1,520,809 | 12/1924 | Cohen | 32—5 |
| 2,271,796 | 2/1942 | Eckman | 32—5 |
| 3,171,202 | 3/1965 | Lasky | 32—5 |

ROBERT PESHOCK, Primary Examiner